(No Model.)

J. P. BUTLER.
PIG NURSERY.

No. 394,955. Patented Dec. 25, 1888.

Witnesses:
L. C. Hills.
W. S. Duvall.

Inventor
J. P. Butler.
O. B. Stocking
Attorney.

UNITED STATES PATENT OFFICE.

JAMES P. BUTLER, OF WAYNE, NEBRASKA.

PIG-NURSERY.

SPECIFICATION forming part of Letters Patent No. 394,955, dated December 25, 1888.

Application filed August 3, 1888. Serial No. 281,848. (No model.)

*To all whom it may concern:*

Be it known that I, JAMES P. BUTLER, a citizen of the United States, residing at Wayne, in the county of Wayne, State of Nebraska, have invented certain new and useful Improvements in a Pig-Nursery, of which the following is a specification, reference being had therein to the accompanying drawings.

This invention has relation to a nursery for pigs, and among the objects in view are to provide a device for feeding and caring for pigs, which former shall resemble so far as possible the sow, and which latter will permit of good ventilation and sunlight.

Other objects and advantages of the invention will hereinafter appear, and the novel features thereof will be particularly pointed out in the claims.

Figure 1:
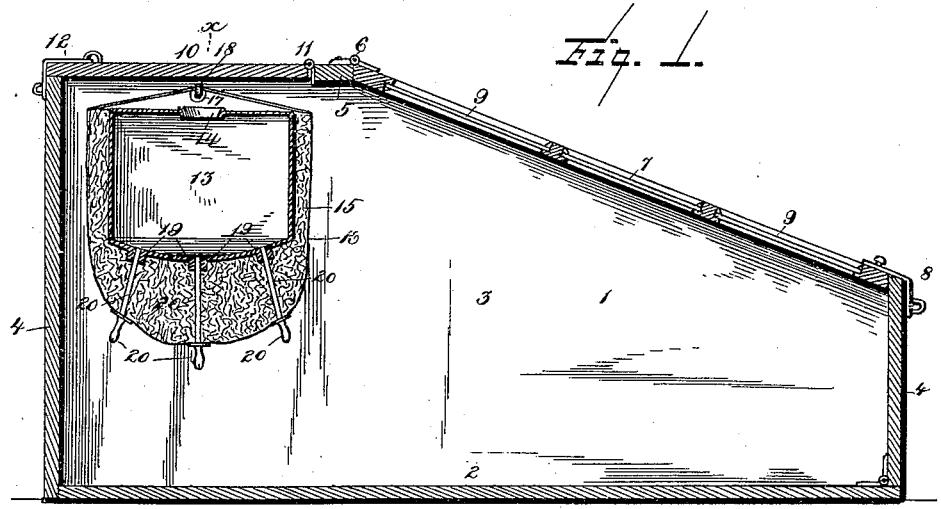
Figure 2:
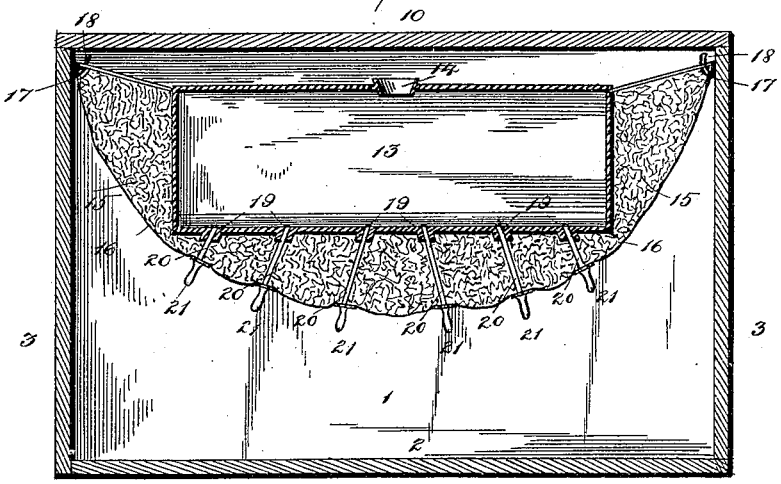

Referring to the drawings, Figure 1 is a longitudinal vertical section of a nursery constructed in accordance with my invention; and Fig. 2 is a transverse vertical section, the section being taken on the lines $x\ x$ of Fig. 1.

Like numerals of reference indicate like parts in both figures of the drawings.

1 represents a rectangular box or compartment, and the same is formed with bottom 2 and side and end walls, 3 and 4, respectively. Extending transversely across the side walls, 3 3, and secured thereto, is a strip, 5, said strip being arranged intermediate the end walls of the compartment. Hinged to the strip, as at 6, and extending to the forward end wall, is a sash-frame, 7, the forward end of which may be locked to said end wall by a staple, hasp, and lock, 8. This sash is provided with panes 9 to admit of sunlight, and the sash as a whole may be raised and lowered either for the entrance or withdrawal of a litter of pigs or for the admission of air. A door or trap, 10, is hinged, as at 11, to the opposite side of the strip 6, which door is adapted to be locked, as at 12, to the rear end wall of the compartment.

13 represents a metal or other tank, which may be of any shape desired, and is provided at its top with a bung or opening, 14. The sides and bottom of the tank 13 are surrounded by a padding of hair, excelsior, cotton, or other suitable material, 15, the same being applied in a semicircular shape to represent the belly of a sow. Surrounding the padding is an outer covering, 16, of leather, hide, or other suitable material, at the two opposite longitudinal ends of which are formed eyes 17, by which the tank and its covering are adapted to be suspended upon hooks 18, inserted opposite each other in the sides 3 of the compartment.

Openings 19 are formed in the bottom of the tank 13, and from the same, and passing through the padding and outer covering, 15 and 16, respectively, there extend tubes 20, to the outer ends of which are applied nipples or teats 21. Any number of nipples may be employed, so that two or more litters of pigs may be accommodated.

By raising the trap 10, milk or other liquid food may be poured into the tank 13 through the bung 14, which liquid may be drawn off through the nipples and tubes by the pigs in the compartment.

Having described my invention and its operation, what I claim is—

1. A nursery for pigs, comprising a tank, an outer padding, and a covering for the same, and a series of tubes extending from the tank through the padding and covering and provided with nipples, substantially as specified.

2. The combination, with a nursery for pigs, comprising a tank, a padded covering for the same, and a series of tubes extending from the tank through the padding and covering and provided with nipples, of a support to which the outer covering is adapted to be connected, substantially as specified.

3. The combination, with a closed compartment having a door, of a tank supported therein and provided with a padding and an outer covering, and a series of nipples extending from the tank through the padding and covering, substantially as specified.

4. The compartment 1, having the doors 7 and 10 and opposite hooks 18, in combination with the tank 13, having openings 19, tubes 20, having nipples 21, the padding 15, surrounding the tank, and the covering 16, surrounding the padding and provided with eyes 17, adapted to take over said hooks 18, substantially as specified.

In testimony whereof I affix my signature in presence of two witnesses.

JAMES P. BUTLER.

Witnesses:
F. A. DEARBORN,
JOHN BUSSLE.